Oct. 29, 1968  W. J. VORKOEPER  3,408,042
VACUUM VALVE

Filed Sept. 14, 1965  2 Sheets-Sheet 1

INVENTOR
WILLIAM J. VORKOEPER
BY *Francis J. Thornton*
ATTORNEY

Oct. 29, 1968  W. J. VORKOEPER  3,408,042
VACUUM VALVE

Filed Sept. 14, 1965  2 Sheets-Sheet 2

INVENTOR
WILLIAM J. VORKOEPER
BY Francis J. Thornton
ATTORNEY

United States Patent Office 3,408,042
Patented Oct. 29, 1968

3,408,042
VACUUM VALVE
William J. Vorkoeper, 13140 Pierce Road,
Saratoga, Calif. 95070
Filed Sept. 14, 1965, Ser. No. 487,240
8 Claims. (Cl. 251—334)

ABSTRACT OF THE DISCLOSURE

A high vacuum seal for connecting opposed bodies consisting of an annular channel, a metal gasket disposed in the channel and a fin constructed to enter the channel and to deform the gasket in such a manner that portions of the gasket are extruded on both sides of the fin and between the channel to thereby cold work the same. The bottom of the fin is provided with a flat surface which upon additional movement of the fin relative to the channel causes surface heating and annealing of the opposed gasket surface to thereby effect a seal with the fin.

---

This invention relates primarily to valves for general utilization in controlling flow through conduits, but is particularly concerned with an all metal sealing system which is applicable for use under high vacuum conditions.

There are many common valves presently in use for controlling the flow of fluids, such as water, oil and the like. Such valves are known as globe valves, gate valves or check valves. Each of these are used in various applications to start, stop, or regulate fluid flows. Each such valve basically consists of a housing, a valve seat, a valve, a valve stem and a means of operating the stem. For common water valves and the like, the valve seating material is usually a soft material, such as rubber or plastic composition in the form of a washer or O-ring. However, because of the vapor pressure of such materials, they are unsatisfactory for holding a high vacuum. For this reason, special vacuum valves having highly polished mating surfaces are used. However, these valves, although providing a reasonably good sealing for low vacuums, leak at high vacuums. Polished surfaces as used in such valves are made up of peaks varying in height up to approximately 4 microinches. Thus, two such surfaces just touching leave some leakage canals between the peaks in which the heights could be roughly 8 times the mean free path of a gas, such as helium at 1 atmosphere, and approximately 800 times the molecular dimension of a helium molecule. In an attempt to avoid this problem, flat gaskets of soft material were made and inserted between the polished surfaces. When the surfaces were forced together with sufficient pressure to cause the softer material to cold flow, the valleys of the harder material were filled and the leakage canals cut off. In a valve of this nature, the gaskets are made of flat stock and generally can be used with assurance but once, for such gaskets become less and less reliable as a means of preventing leakage due to the changed conditions in the gasket itself. The flattening of the gasket increases the sealing area many times over the original area which means that the total force required in succeeding sealings to achieve the same unit stress must be proportionally increased.

The cold flowing of the gasket material which results from the applied pressures will increase the hardness of the gasket material. This causes still greater difficulty for as the hardness of the material increases with increased working it means that on subsequent sealings the mass cold flow of the gasket material possible on the first cycle becomes virtually impossible to duplicate.

The present invention avoids all these difficulties of the prior art devices and produces a vacuum valve which will provide sealings of high vacuum systems for extended periods of time. The invention further provides a valve which does not obstruct gaseous fluid flow when it is opened and yet can close tightly and hold against leakage when it is closed.

The invention still further provides a vacuum tight valve which can be operated a large number of times with an effective closure seal being made each time the valve is operated.

The invention also provides a valve in which relatively high seating pressures can be employed for the purpose of affording a tight seal at each closure without effecting damage to the valve parts or necessitating replacement of the sealing gasket.

Briefly described, the invention comprises a novel valve seat arrangement whereby the gasket material is constricted so that the cold working of the material composing the gasket is virtually eliminated such that upon subsequent sealings of the gasket a vacuum tight seal is achieved.

Other features and advantages of the invention together with the foregoing are obtained in the embodiment of the valve described in the accompanying description and illustrated in the accompanying drawings in which.

The present invention is customarily used in a high vacuum line connected between a chamber to be evacuated and the pumping arrangement used for reducing the pressure within the vacuum. The term "high vacuum" will be used herein to mean a vacuum in which the pressure is of the order of $10^{-6}$ mm. mercury or less.

Figure 1:
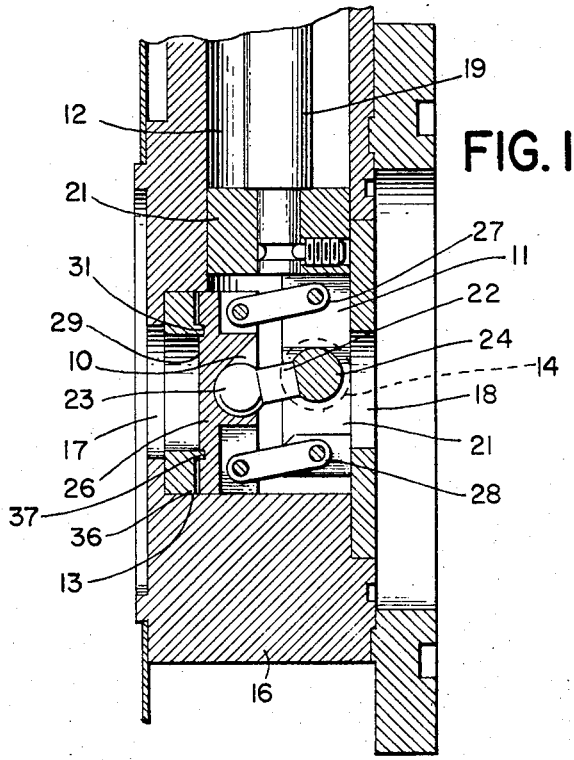
FIGURE 1 is a cross section on an axial plane through one embodiment of a valve constructed according to the present invention.

With reference now to the figures and especially to FIGURE 1, there is shown one view of an embodiment of the present invention in which there is provided a high vacuum sealing valve consisting of a housing or valve body 16 fabricated from a metal of suitable strength. This housing is provided with ports 17 and 18 which when opened are interconnected to provide a flow passage through the body 16. Disposed within the body is a plunger 19 operable by any suitable means, such as a power mechanism (not shown), effective to move a sliding yoke 21 along the plunger axis between an open and closed position. This plunger 19 is also within the vacuum system and is protected from the atmosphere by a metal bellows (not shown) which is sealed to the shaft in a manner well known to the art to prevent any of ambient atmosphere from leaking into the valve chamber.

The yoke 21 is connected to the valve gate 26 by means of a linkage mechanism including a shoe block 11, a central link 22 having a ball end 23 and a rocker end 24 and side links 27 and 28. The rocker end 24 of central link 22 is seated in an appropriate socket 14 within the block 11 and the ball end 23 is seated in an appropriate socket 10 in the valve gate 26. The side links 27 and 28 are individually pivoted to the block 11 and to the gate 26 so that all of the three links interconnecting the block and the gate are in parallel relationship and form a motion parallelogram. The gate 26 is contoured to afford a planar face 29 in which there is provided a recess or channel 31 which is annular in configuration and bounded by a pair of cylindrical side walls 32 and 33 and a planar bottom wall 34. The recess 31 is initially provided with a sealing gasket 51. The gasket is preferably in the form of a toroid or annular ring that is circular in axial cross section. This ring may be composed of any number of various metals as will later be described.

Disposed in the housing 16 surrounding the port 17 and in opposition to the valve disk 26 is an annular insert 36 known as a fin ring which is force fitted and sealed within a receiving cavity 13 in the body 16 and provided with an annular fin or valve seat 37 corresponding approximately to the configuration of the channel 31. This fin ring must be fixed in the housing 16 by means of soldering or the like so that a vacuum tight seal exists between the housing 16 and the ring 36. The fin 37 provided on the ring 36 is rectangular in cross section and bounded by a pair of circular cylindrical walls 38 and 39 and a bottom wall 41 of planar extent. The radii of the two circular cylindrical walls 38 and 39 of the fin member 37 are respectively less and more than the radii of the two circular cylindrical walls 32 and 33 of the channel 31 by predetermined amounts so that gaps or clearing spaces 43 and 44 are left between the respective boundaries of the channel and the fin.

When the plunger 19 is operated along its axis from the position shown in FIGURE 1, for example, and in an upward direction, the rising yoke 21 simultaneously through the block 11 and all of the links 22, 27 and 28, acts to unseat the gate 26 from the fin 37 by moving the gate 26 first to the right and in the direction of the passage between the ports and then when the disk has cleared the fin and fin ring cavity 13 lifting the gate bodily out of the through passage between the ports 17 and 18 into the rod-yoke cavity 12.

Upon reverse actuation of the plunger 19, that is, in a downward direction in FIGURE 1 the block 11 and yoke 21 lowers until such time as the gate 26 seats on the wall of the through passage between the ports. At this time, the links 22, 27 and 28 are effective to urge the gate to the left in FIGURE 1 and to guide it so as to enter it into the insert cavity 13 and seat the fin 37 into the channel 31. The gate not being precisely restrained by the fin ring cavity 13 can move to a slight extent so that under appropriate forces the rib 37 enters the recess 31 in a substantially centralized relationship.

Figure 2:
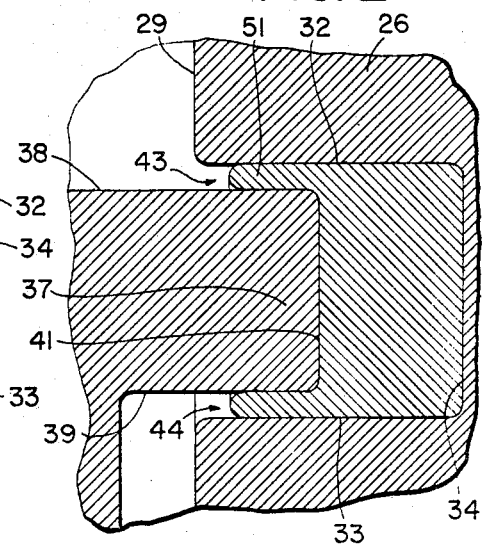
FIG. 2 is an enlarged cross-section area in the same plane as FIGURE 1, but showing a portion of the seat and seating mechanism.

This action places sufficient force on the gate 26 so that fin 37, in entering the channel 31, deforms and displaces the metal sealing gasket 41 therein. This deformation causes the gasket to be deformed into a shape which substantially occupies all of the volume of the channel 31 as shown in FIG. 2 and to extrude some of the gasket material into the gaps 43 and 44 so that the extruded metal tends to rise between the walls 32 and 38, respectively, and the circular cylindrical walls 33 and 39, respectively. When this occurs, a vacuum tight seal is effected. For effective sealing to occur upon seating of the disk 27, the metal of the sealing ring 51 must be subjected to a force which exceeds the value of the unit compressive strength of the sealing ring material.

In order to fully describe the present invention, it is necessary that the type of materials and the typical dimensions of a valve be discussed. Typically, the gate 16 may have a 2 inch diameter and the end surface area of the fin will be approximately ¼ square inch and from 38 thousandths of an inch to 40 thousandths of an inch in radial dimension. The corresponding channel within the gate will then be between .042 and .044 of an inch wide. The body, gate, yoke, shoe blank, and fin insert are preferably made of stainless steel to supply the requisite strength to the unit. The sealing gasket may be of a soft material, such as gold wire, .040 inch in diameter. With these dimensions and materials, a pressure on the gasket, of approximately 40,000 lbs. p.s.i., assures a seal tightness such that no leaks are detected when the device is tested by subjecting one side of the valve to a helium atmosphere and the opposite side checked with a helium detecting device which is capable of detecting $10^{-13}$ standard liters per second of helium.

Figure 4:
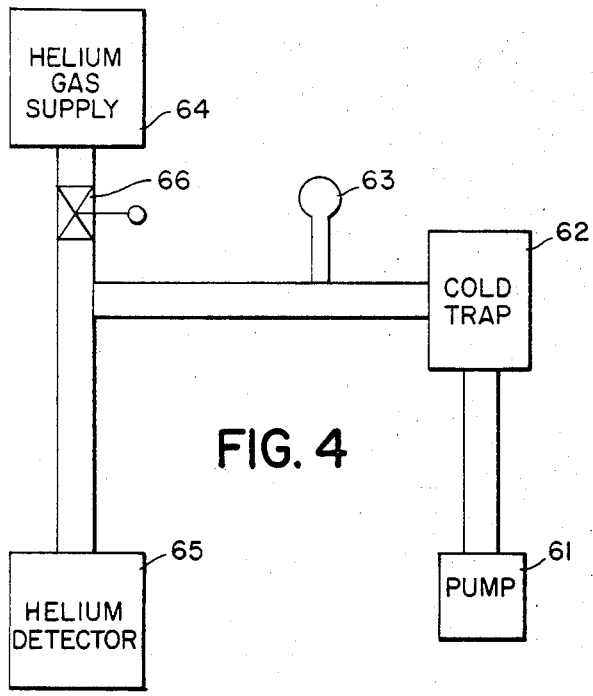
FIG. 4 is a schematic view of the testing apparatus used in testing the valves built in accordance with the invention.

Such testing may be performed on the valve of the present invention, as by the apparatus shown in schematic form in FIG. 4. The equipment shown herein for testing the seal basically comprises a vacuum pumping station 61, a cold trap 62, an ion gauge 63, a helium gas supply 64, a helium leak detector 65 and the seal 66 that is under test. The seals being tested were considered to be vacuum tight, if no leakage could be detected with a helium atmosphere on one side of the valve, a vacuum of $10^{-6}$ torr on the other side of the gate and the detector 65 set to be capable of detecting less than $10^{-10}$ cc. per second of helium.

Generally, the test procedure would be started with 10 to 20 openings and closings of the valve using full operating pressure. Following the last closing of the valve, the system is pumped down and the seal checked by measuring the amount of helium leakage across the valve. Once the seal was found to be helium tight, life tests were run. Several of these life tests taken with different materials as the sealing element showed that the device remained helium tight over long periods of time. For example, in one such test, where the valve was used to seal off an evacuated electron tube, it was found thirteen months later that pressure readings taken on the tube indicated that the valve was as tight as the wall sections of the tube itself. This time testing has been done using indium, and lead as the sealing elements with excellent results.

Tests of devices according to the present invention have been conducted for an excess of 1500 successive operations of the valve with no indication of change in the valve characteristics or seal material and no indication of helium leakage by the test device.

In addition to gold, the sealing gasket has been made of indium, lead, silver, aluminum and copper. However, since aluminum and copper can easily form oxides which can cause unsatisfactory performance, these metals should only be utilized in atmospheres not conducive to oxidation.

Figure 3:
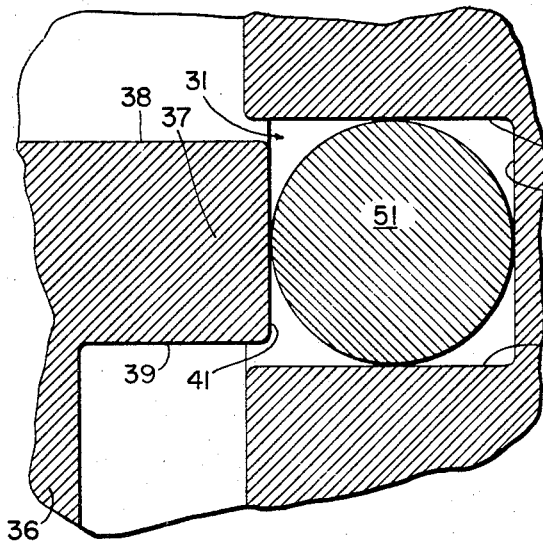
FIG. 3 is a cross-section similar to FIG. 2 but showing the valve seating gasket in initial condition.

The full reason for the ability of this valve to operate over extended periods and numerous openings and closings is not completely known. However, it is believed that containing of the gasket in a channel permits surface annealing of the gasket material. This is described as follows. When the fin first enters the channel and deforms the sealing gasket from the initial condition shown in FIG. 3 to that shown in FIG. 2, the sealing gasket is extruded partially in a controlled fashion in the gaps 43 and 44 between the fin and the gasket channel. This extrusion is such that the metal occupies any possible leakage location on either side of the fin. It is apparent that work hardening of the material will occur during this first cycle and the most severe cold working occurs in the small escape passage 43 and 44 provided on either side of the fin between the fin and channel walls. This work hardening raises the hardness in those areas above that of the main body of the sealing element. Thus, when the same unit pressures in future closings are used, further extrusion in this region is effectively prevented.

Since the requirements for sealing involve fin pressures exceeding the compressive strength of the sealing element, every cycle causes some work hardening of the bulk material. However, the sealing element does not become work hardened to the point where it can crack or leak, for once the softer sealing element has been pressed into a three dimensional negative replica of the fin surface by the initial closing, then each material will have peaks, estimated to be 4 microinches high. On subsequent closings, these peaks now on both the fin and the gasket material will mesh perfectly and prevent leakage or will be, in most cases, opposing each other in random register. Since perfect registration of the two is as a practical matter almost impossible, the latter case will be the most usual. As such opposing peaks begin to impinge, the softer material peaks will begin deforming, flowing, and filling the valleys in a polished fin surface. Internal friction in the soft metal peaks plus friction generated on the surface of the hard metal peaks will combine to raise the temperature of the soft metal surface. Two considerations indicate that this temperature may go quite high. Firstly, the peaks by their shape tend to be thermally isolated from the supporting body of gasket material. Secondly, the time in which the heat generation occurs is very small. Thus, the heat generated by compression of the fin against the gasket material in subsequent closings is generated in such a short time and in such a thermally isolated body, as to cause the temperature to rise sufficiently to provide surface annealing of the gasket material.

It would appear, therefore, that the active sealing surface of the gasket material is renewed at each closing such that the prior working effects are erased and a new imprint of the fin surface is made each time. Each sealing thus anneals the material so that subsequent cracking of the seal does not occur.

If the fin did not apply equal pressure to all points of the gasket material, such surface annealing would not occur over the entire seal and leakage paths could result. One means of overcoming this problem would be to apply progressively greater sealing pressures at each closing. Such a solution, however, is self defeating for it results in shorter operating life of the seal, due to progressive loss of gasket material by extrusion. Thus, in the present invention, it is necessary that the applied pressure be equally distributed over the entire sealing surface. This is accomplished by transmitting substantially all the closing forces through the ball and socket linkage 22 which is centrally located on the gate 26. By centrally applying the sealing forces to the gate, any initial misalignment is automatically adjusted for. This adjustment occurs because the centrally applied force is transmitted equally to all points on the annular fin. Thus, the closing forces are uniformly distributed over the entire sealing surface.

This will, of course, occur only if substantially all the force is transmitted through the central linkage. It is therefore important that the side links 27 and 28 be used only as guides to prevent gross mechanical jamming and not be used to transmit any substantial amount of the closing forces to the gate.

Figure 6:
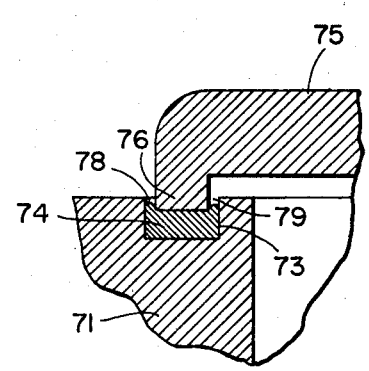
FIG. 6 is an enlarged view of the fin and seal of the valve of FIG. 5.
Figure 5:
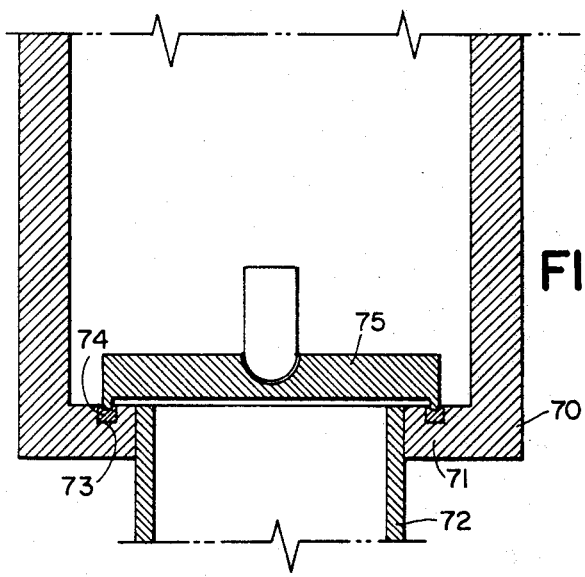
FIG. 5 is a view of the seating arrangement of another embodiment of a valve constructed pursuant to the present invention.

Other modifications to the present invention can readily be made. One such embodiment is shown in FIGS. 5 and 6. FIG. 5 shows an embodiment of the presented invention in which the fin is formed as a part of the gate structure. For purposes of clarity, only the essential elements of the invention are shown. These comprise a hollow cylindrical housing 70 having an annular flange portion in which is affixed a hollow tube 72 leading to a vacuum pump (not shown). Disposed in the flange 71 is an annular channel 73 in which the gasket 74 is maintained. In this embodiment, the gate 75 of the valve carries a fin 76 adapted to fit into the channel 73 in the same manner as described in the embodiment of FIGURE 1. That is, the fin 76 is such that when it is inserted into the channel 73 small regions 78 and 79 are left into which the soft gasket material can be extruded.

It should of course be understood that the invention can be used for other applications besides its described use as a vacuum valve. The valve can obviously be used to prevent leakage from high pressure systems. Furthermore, the valve is suitable for use in controlling fluid flow in any pressure or vacuum system which is being exposed to high temperatures, low temperatures, radiation or vibration. Also, selection of suitable materials will permit the described valve to be constructed such that it will be resistant to chemical corrosion and thus suitable for use in corrosive fluid pressure systems.

Having now described at least one specific embodiment of the present invention and since other modifications, changes and adaptations of the present invention may occur to those skilled in the art, it is respectfully requested that the invention be limited only by the following claims.

I claim:

1. A high vacuum seal for connecting opposed bodies having a flow passage through at least one of said bodies, comprising means within one body defining a sealing channel about said flow passage, said channel being annular in configuration and defined by a pair of cylindrical side walls spaced a predetermined uniformed distance apart and being further defined by a bottom wall joining said side walls, a metal gasket disposed in said channel and against said bottom wall, a fin disposed on said other body for forming a seal with said gasket, said gasket being made of a material softer than the material of which said fin and said means defining said channel are made, means for moving said bodies relatively towards each other with a force comparable in magnitude to the forces required to bring said gasket to its yield point in compression, said fin consisting of an annular rib on said second body receivable within said channel upon relative movement of said bodies, said fin being defined by a flat bottom wall adapted to abut said sealing gasket and by a pair of cylindrical side walls spaced apart a uniform distance less than said predetermined distance so that said fin can freely enter said channel to form therewith gaps on each side of the fin sufficiently wide to allow a limited extrusion of said gasket into said gaps as said bodies are moved toward each other under said force, the extruded portions of said gasket being cold hardened by extrusion to prevent further extrusion and to forcibly retain the remainder of the gasket within the channel where additional movement of fin relative to said channel causes surface heating and annealing of the gasket surface opposing said flat bottom wall of said fin.

2. A seal as in claim 1 in which the force exerted upon the gasket by the fin not only deforms said gasket but also displaces the material of the body surrounding said channel and gasket whereby the gasket is subjected to restoring forces from the surrounding material when such force on the gasket by the fin is discontinued.

3. A seal as in claim 1 in which said gasket when first installed is round in axial cross section.

4. A seal as in claim 1 in which said fin and said channel are mounted to move transversely relative to each other whereby the radial distances between said fin and said channel may be equalized.

5. Apparatus as in claim 1 wherein said opposed bodies comprise a valve body and a gate and wherein said channel is formed in said valve body and wherein said gate carries said fin.

6. Apparatus as in claim 1 wherein said opposed bodies comprise a valve body and a gate and wherein said valve body is provided with said fin and within said channel is formed into said gate.

7. Apparatus as in claim 1 wherein one of said bodies is a valve body and the other of said bodies is a valve gate and further including means for controlling the motion of said valve gate with respect to said valve body so that forces applied therebetween are equally distributed about the portions of contact between said fin and said gasket.

8. Apparatus as in claim 7 wherein said means for equally distributing the forces comprises a ball joint toggle mechanism, a rod having ball ends, one of the ends being connected centrally to the central portion of said gate, a yoke including means for capturing the other end of said ball joint toggle, means formed in said valve body for permitting sliding motion of said yoke, said last named means being so constructed that movement of said yoke in a predetermined direction causes said ball joint toggle to expand the distance between said gate and said yoke so that said closing forces are exerted upon said gate.

References Cited

UNITED STATES PATENTS

| | | | |
|---|---|---|---|
| 3,108,780 | 10/1963 | Wishart | 251—334 |
| 3,168,282 | 2/1965 | Latshaw et al. | 251—333 |
| 3,185,438 | 5/1965 | Smirra | 251—334 |
| 3,195,552 | 7/1965 | Rasmussen | 251—333 X |
| 3,208,717 | 9/1965 | Palmer et al. | 251—169 |
| 3,228,419 | 1/1966 | Smith et al. | 251—333 X |
| 3,282,276 | 11/1966 | Mark | 251—333 X |

OTHER REFERENCES 73,025  11/1931  Sweden.

SAMUEL SCOTT, *Primary Examiner.*